United States Patent [19]

Beeckel

[11] Patent Number: 4,870,267
[45] Date of Patent: Sep. 26, 1989

[54] AMBIENT LIGHT SENSITIVE ACTIVATOR

[75] Inventor: Peter C. Beeckel, Seattle, Wash.

[73] Assignee: The Boeing Company, Seattle, Wash.

[21] Appl. No.: 143,197

[22] Filed: Jan. 13, 1988

[51] Int. Cl.$^4$ .......................... G01V 9/04; G01P 3/36
[52] U.S. Cl. ..................................... 250/222.1; 356/28
[58] Field of Search ................. 356/28, 376, 375, 394,
356/384, 385, 386; 250/221, 222.1, 222.2, 224;
358/108, 109, 105

[56] References Cited

U.S. PATENT DOCUMENTS

| | | | |
|---|---|---|---|
| 1,747,664 | 2/1930 | Droitcour | 89/41.02 |
| 1,995,606 | 3/1935 | Edelman et al. | 250/41.5 |
| 2,294,730 | 9/1942 | Eggers | 161/18 |
| 2,347,194 | 4/1944 | Holliday | 177/337 |
| 2,400,489 | 5/1946 | Dana et al. | 235/92 |
| 2,653,309 | 9/1953 | Hausz | 340/228 |
| 2,866,373 | 12/1958 | Doyle et al. | 88/1 |
| 2,938,201 | 5/1960 | Thornton | 343/5 |
| 2,941,459 | 6/1960 | Fairbanks | 95/36 |
| 2,955,209 | 10/1960 | Eckweiler | 250/221 |
| 3,058,109 | 10/1962 | Berning | 346/1 |
| 3,267,286 | 8/1966 | Bailey | 250/219 |
| 3,422,274 | 1/1969 | Coan | 250/209 |
| 3,614,736 | 10/1971 | McLaughlin | 340/146 |
| 3,791,741 | 2/1974 | Brenholdt | 356/163 |
| 3,849,784 | 11/1974 | Holzapfel | 346/107 |
| 3,996,460 | 12/1976 | Smith | 250/203 |
| 4,122,522 | 10/1978 | Smith | 364/427 |
| 4,163,283 | 7/1979 | Darby | 364/439 |
| 4,167,330 | 9/1979 | Haville | 356/28 |
| 4,253,020 | 2/1981 | Michel et al. | 356/28 |
| 4,433,325 | 2/1984 | Tanaka et al. | 250/222.1 |
| 4,470,048 | 9/1984 | Short, III | 343/5 SA |
| 4,490,851 | 12/1984 | Gerhart et al. | 356/28 |
| 4,574,238 | 3/1986 | Weinlich | 250/222.1 |
| 4,727,258 | 2/1988 | Tyssen et al. | 356/28 |

Primary Examiner—David C. Nelms
Assistant Examiner—Michael Messinger
Attorney, Agent, or Firm—Dellett, Smith-Hill and Bedell

[57] ABSTRACT

An activation signal is generated when an aircraft passes directly overhead and may be employed to record aircraft noise levels or to trigger a zenith camera for producing a photograph of the aircraft useful in determining aircraft position. When used in connection with a second instrument located at a fixed distance from the first and along the path of the aircraft, aircraft ground speed may be determined. Ambient light, normally passing through an optically defined airspace and thence incident upon light sensors, is partially blocked when an object such as an aircraft is present. A signal proportional to the change in ambient light incident upon the sensors and a function of the size and shape of the aircraft is used to sense the passage of a wing section. Upon detection of the wing section an activation signal is generated.

15 Claims, 7 Drawing Sheets

AMBIENT LIGHT SENSITIVE ACTIVATOR

BACKGROUND OF THE INVENTION

The present invention relates generally to object detection and in particular to detection of an aircraft flying overhead.

When recording aircraft flyover noise and the like it is important to know when the aircraft is directly overhead and it is also desirable to ascertain its precise ground speed and altitude. Existing methods for determining aircraft overhead time, altitude, offset from a reference location, and ground speed from a ground based installation are generally very expensive and in some cases require extensive set-up times. Examples of current systems include radar and theodolite devices coupled to a computer system.

SUMMARY OF THE INVENTION

The present invention in a principal embodiment thereof includes light sensitive data acquisition means for providing a detection signal in response to a change in, or blockage of, ambient light passing through an optically defined window. The signal is a function of the size and shape of an object moving past the window and is used to detect the presence of an object.

According to an aspect of the present invention, a peak in the detection signal represents the passage of a relatively larger portion of an object. In the case of an aircraft the wing section blocks the greatest amount of ambient light and therefore produces such a peak. A sample and hold circuit is employed to capture the peak value and provide a scaled version of the captured peak for comparison with the detection signal. An activation signal is generated when the detection signal becomes less than the scaled version of the peak value, i.e., when the aforementioned larger portion has just passed.

According to another aspect of the present invention, changes in ambient light unrelated to the passage of an object are taken into account to provide a more accurate detection signal representative of a change in, or blockage of, ambient light caused by the presence of an object.

Accordingly, it is an object of the present invention to provide an inexpensive and easily operated activation device which utilizes ambient light and which may be employed to detect the presence of an aircraft flying directly overhead to supply an activation signal for triggering a zenith camera or for determining aircraft ground speed.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DRAWINGS

DETAILED DESCRIPTION

Figure 1:
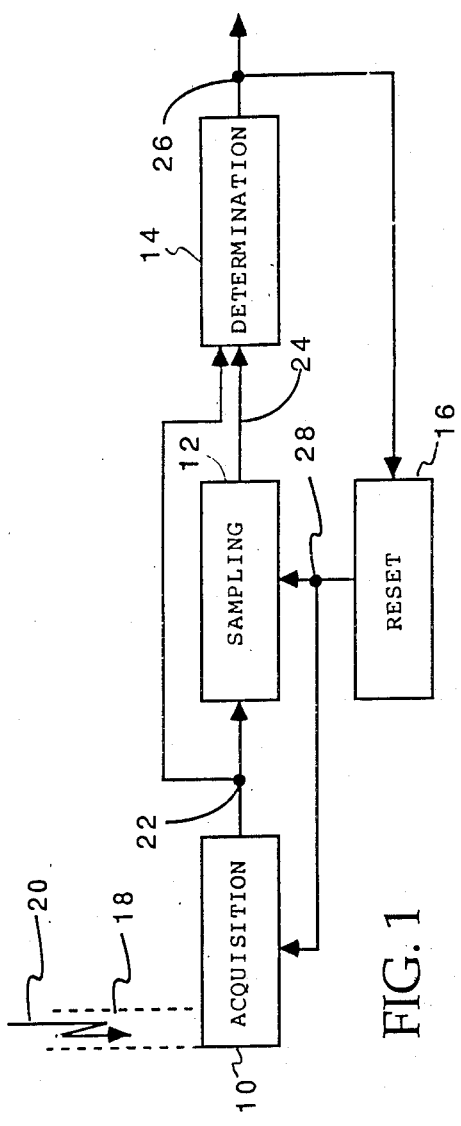
FIG. 1 is a block diagram of an embodiment of the present invention.

Referring to FIG. 1, a principal embodiment of the present invention may be represented by a data acquisition block 10, a data sampling block 12, an output determination block 14, and a reset block 16. The data acquisition block 10 includes light shielding means subsequently described which defines an airspace 18 through which ambient light 20 passes for incidence upon light sensor means internal to the data acquisition block via a narrow window or slit disposed orthogonally to the direction of anticipated object movement. A detection signal 22, produced by data acquisition block 10, is responsive to a change or blockage in ambient light 20, this blockage being caused by the presence of an object in airspace 18. While no object is present in the airspace, detection signal 22 remains at a quiescent level. As an object passes through airspace 18, detection signal 22 rises above its quiescent level in response to the size and shape of the object.

The term "ambient light" as used in this specification and claims is meant to comprehend existing light conditions not associated with the activation circuit. That is to say, the presently described activation circuit is not dependent on a particular light source. The term "optical airspace" as used herein refers to a space through which ambient light passes and impinges upon light sensitive elements such as photoconductors. The presence of an object in the airspace results in a decrease in ambient light incident upon light sensitive elements.

The signal sampling block 12 monitors the detection signal 22 and captures a peak value occurring therein to provide a scaled peak signal 24, e.g., a fixed percentage of the captured peak value. The output determination block 14 detects the occurrence of the peak in the detection signal 22 by comparison of the scaled peak signal 24 with the detection signal 22; when the detection signal 22 falls below the scaled peak signal 24, a peak in the detection signal 22 is implied. When a peak has been found in the detection signal 22, the output determination block 14 generates an activation signal 26.

The reset block 16 supplies a reset signal 28 in response, for example, to the activation signal 26, or in response to manual push buttons or the like to initiate a reset condition in blocks 10 and 12. The data acquisition block 10 compensates for naturally occurring changes in ambient light unrelated to the passage of objects through window 18. During reset, the data sampling block 12 abandons the currently held peak value in preparation for the next peak in the detection signal 22 whereby the circuit is then ready for detection of the next object passing through airspace 18.

Figure 2:
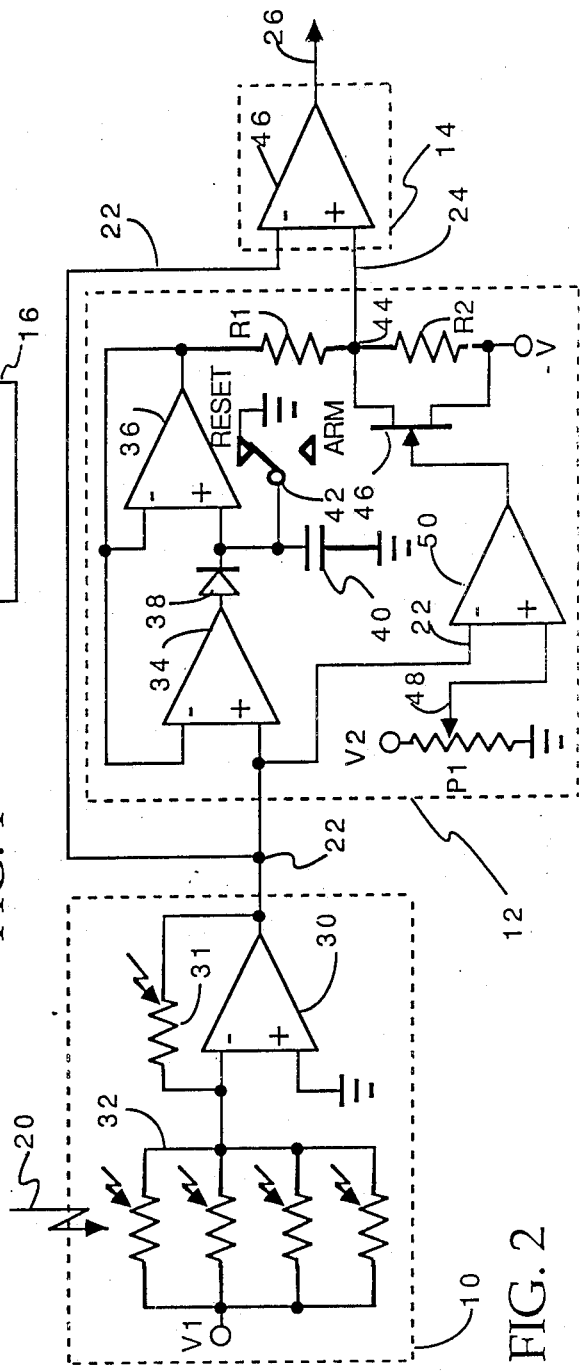
FIG. 2 is a circuit diagram of the embodiment FIG. 1.

Referring to FIG. 2, describing portions of the circuit of FIG. 1 in greater detail, an operational amplifier 30, having its non-inverting input grounded and its inverting input coupled to a voltage V1 through a photoconductor array 32, produces at its output the detection signal 22 representative of the blockage of ambient light 20 incident upon photoconductor array 32 from airspace 18.

A photoconductive feedback resistor 31 is connected between the output and the inverting input of amplifier 30. The photoconductor array 32 and feedback resistor 31 cooperate to provide automatic gain control for amplifier 30. Without a photoconductive resistor in the feedback, the gain of amplifier 30 would vary as the ambient light conditions vary, the gain of amplifier 30 being a function of the relative resistance of the array 32 and resistor 31. By utilizing a photo sensitive resistor, i.e., a resistor 31 similar to those in the array 32, the relative resistance of the array 32 and the feedback resistance is stabilized despite changes in ambient light, and, accordingly, the gain of operational amplifier 30 is more nearly constant.

Data acquisition block 12 suitably includes an input amplifier 34, an output amplifier 36, a diode 38, and a holding capacitor 40. The amplifier 34 receives the detection signal at its non-inverting input, while its output is coupled by way of diode 38 to the non-inverting input of the amplifier 36. The output of the amplifier 36 is fed back to the non-inverting input of amplifier 34. Holding capacitor 40 is interposed between the non-inverting input of the amplifier 36 and ground, while the output of amplifier 36 is returned to a voltage source -V through serially connected resistors R1 and R2, the resistors R1 and R2 being interconnected at a node 44 for scaling the output of the amplifier 36 to a predetermined percentage value. The signal present at the node 44 suitably provides the scaled peak signal 24.

Prior to "arming" of the circuit, a switch 42 is momentarily set to a reset position to discharge any voltage across the holding capacitor 40, and is then returned to an arm position. When an object enters airspace 18 (FIG. 1), a portion of the ambient light 20 otherwise incident upon photoconductor array 32 is blocked. As a result, detection signal 22 rises and the output of amplifier 34 rises to charge holding capacitor 40, while the output of amplifier 36, taking its input as the voltage across the holding capacitor 40 terminals, also begins to rise. When a peak in the detection signal 22 has occurred, detection signal 22 begins to fall, causing the output of amplifier 34 to fall, thereby discontinuing the charging of the holding capacitor 40. The voltage then present across the terminals of the holding capacitor 40 is stabilized and the output of the operational amplifier 36 is representative of the peak in detection signal 22. The scaled peak signal 24 present at the node 44 comprises a predetermined percentage of the detection signal 22, the predetermined percentage being a function o the resistances of the resistors R1 and R2.

The output determination block 14 includes a comparator 46, receiving the scaled peak signal 24 at its positive input and the detection signal 22 at its negative input. Comparator 46 asserts at its output the activation signal 26 when the scaled peak signal 24 is greater than the detection signal 22.

It is desirable to ignore peak values in the detection signal which are below a given threshold. To this end, FET 46 having its drain coupled to node 44 and its source coupled to voltage source -V is utilized to maintain the scaled peak signal 24 normally at or near the voltage of source -V. A potentiometer P1 is connected between a voltage V2 and ground and includes a movable tap 48. The output of a comparator 50 is coupled to the gate of FET 46, while its positive input is coupled to tap 48. The negative input of comparator 50 receives detection signal 22. Potentiometer P1 is adjusted for providing a threshold voltage such that when the detection signal 22 is below the threshold, the output of the comparator 50 turns the FET 46 on and drives the voltage at the node 44 close to the potential of source -V, inhibiting production of an activation signal 26. When the detection signal 22 rises above the threshold, FET 46 is turned off and the voltage at the node 44 is representative of the predetermined percentage of the detection signal.

Figure 3:
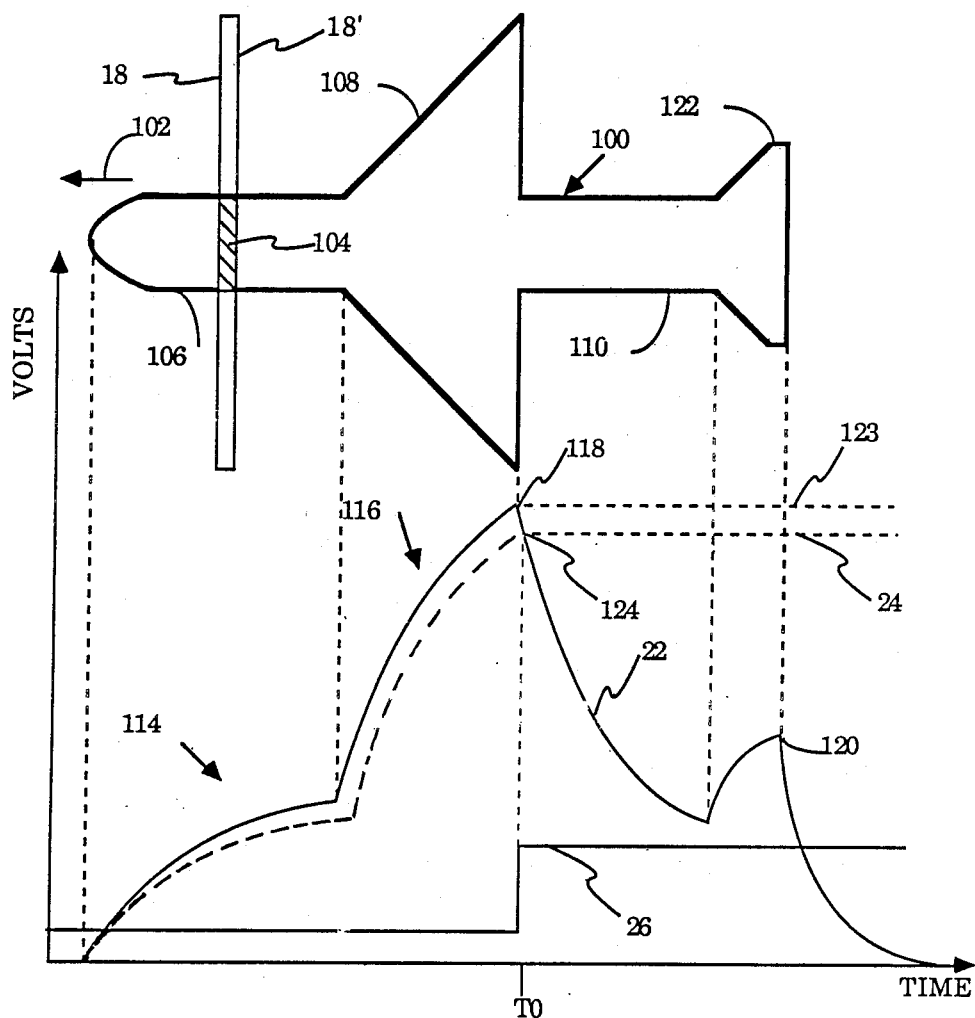
FIG. 3 illustrates the passage of an aircraft through an optically defined window and various signals generated in the circuit of FIG. 1 as a result thereof.

Referring to FIG. 3, an aircraft 100 is illustrated as passing through airspace 18 in the direction of arrow 102 while the corresponding detection signal 22 is seen immediately therebelow. As the aircraft 100 passes airspace 18, the ambient light 20 blocked by the aircraft 100 varies. A shaded portion 104 of an optical window or slit 18' represents the blockage of ambient light due to the presence of aircraft 100 in the corresponding airspace, and, at the instant depicted in FIG. 3, represents the amount of blockage due to a body section 106. The waveform presented by the detection signal 22 is generally proportional to the size of shaded portion 104 and is therefore generally a function of the size and shape of the passing aircraft 100. The various portions of the illustrated waveform of the detection signal depict its amplitude when parts of the aircraft immediately thereabove are aligned with window 18'.

As the aircraft 100 first enters airspace 18, the body section 106 causes the detection signal 22 to rise as indicated by reference numeral 114. When a wing section 108 of aircraft 100 passes through the window 18', the size of the shaded portion 104 will increase to a maximum as noted by reference numeral 116. As the last of the winged section 108 passes, the shaded portion 104 suddenly becomes smaller as a body section 110 then enters airspace 18. The passage of wing section 108 thus causes a peak 118 in detection signal 22, while a second peak 120 in detection signal 22 is the result of passage of a tail section 122.

The output of amplifier 36 (FIG. 2), a signal 123, follows the detection signal 22 through regions 114 and 116 until the occurrence of the peak 118 and thereafter maintains a value substantially equal to the peak 118 value. The scaled peak value 24 follows the signal 123 as a fixed percentage thereof. When the detection signal 22 then becomes less than the scaled peak signal 24, at a point indicated by reference numeral 124, the activation signal 26 increases from a non-activation state to an activation state, i.e., at a time T$\phi$. At a later time, not shown in FIG. 3, the signal 123, the scaled peak signal 24, the detection signal 22, and the activation signal 26 will be returned to their respective initial values in preparation for the detection of another aircraft passing through the same airspace.

Figure 4:
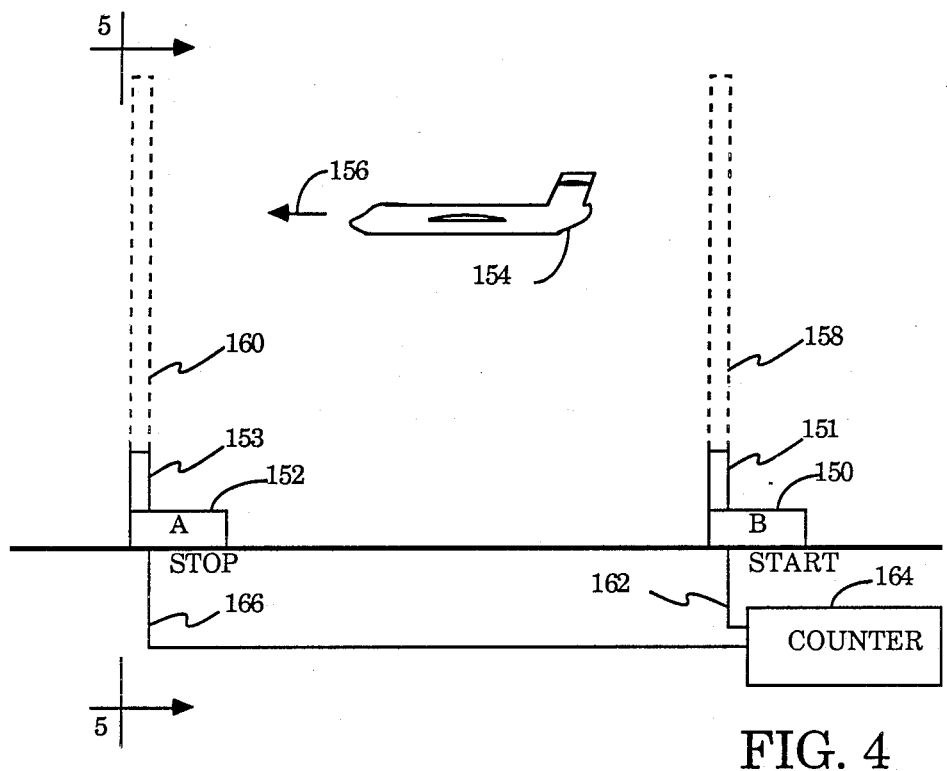
FIGS. 4 and 5 depict an arrangement of two devices similar to the one illustrated in FIG. 1 which may be used to determine aircraft ground speed.
Figure 5:
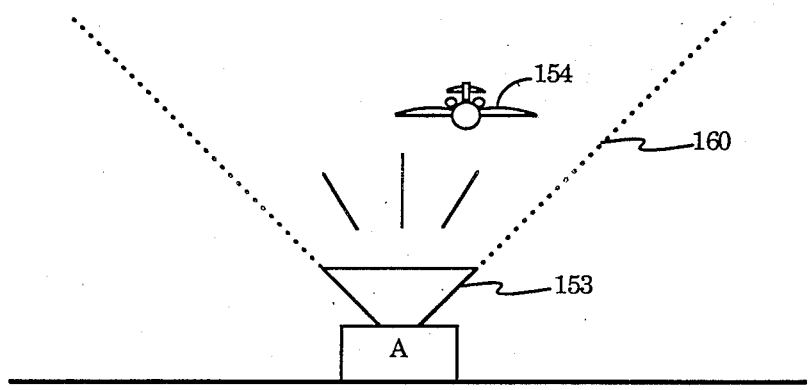

In FIGS. 4 and 5, with FIG. 5 being taken along lines 5—5 of FIG. 4, a first light sensitive activator 150 and a second light sensitive activator 152, each similar to the one depicted in FIGS. 1-3, are positioned along the flight path of an aircraft 154 having a direction of travel indicated by arrow 156. The light sensitive activators 150 and 152 include light shields 151 and 153 which define, respectively, airspace 158 and airspace 160 intersecting the path of aircraft 154. A first activation signal 162, generated by light sensitive activator 150 in response to the passage of aircraft 154 through window 158, is employed to start a counting operation by counter element 164. A second activation signal 166, generated in response to the passage of aircraft 154 through window 160, is used to terminate the counting operation. The value remaining in the counter element 164 after termination of the counting operation is representative of the ground speed of aircraft 154 between airspace 158 and airspace 160.

Figure 6:
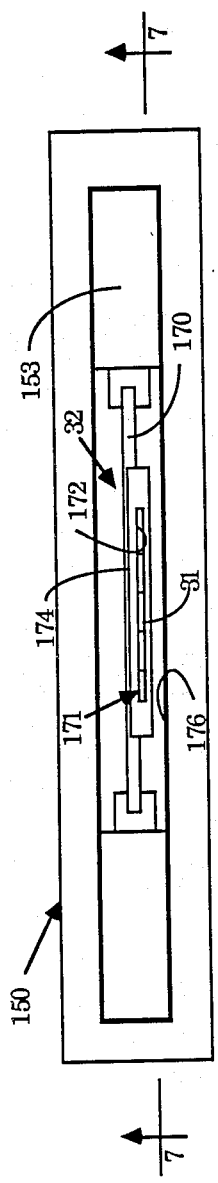
FIGS. 6 and 7 illustrate a light shielding means for defining an optical window.
Figure 7:
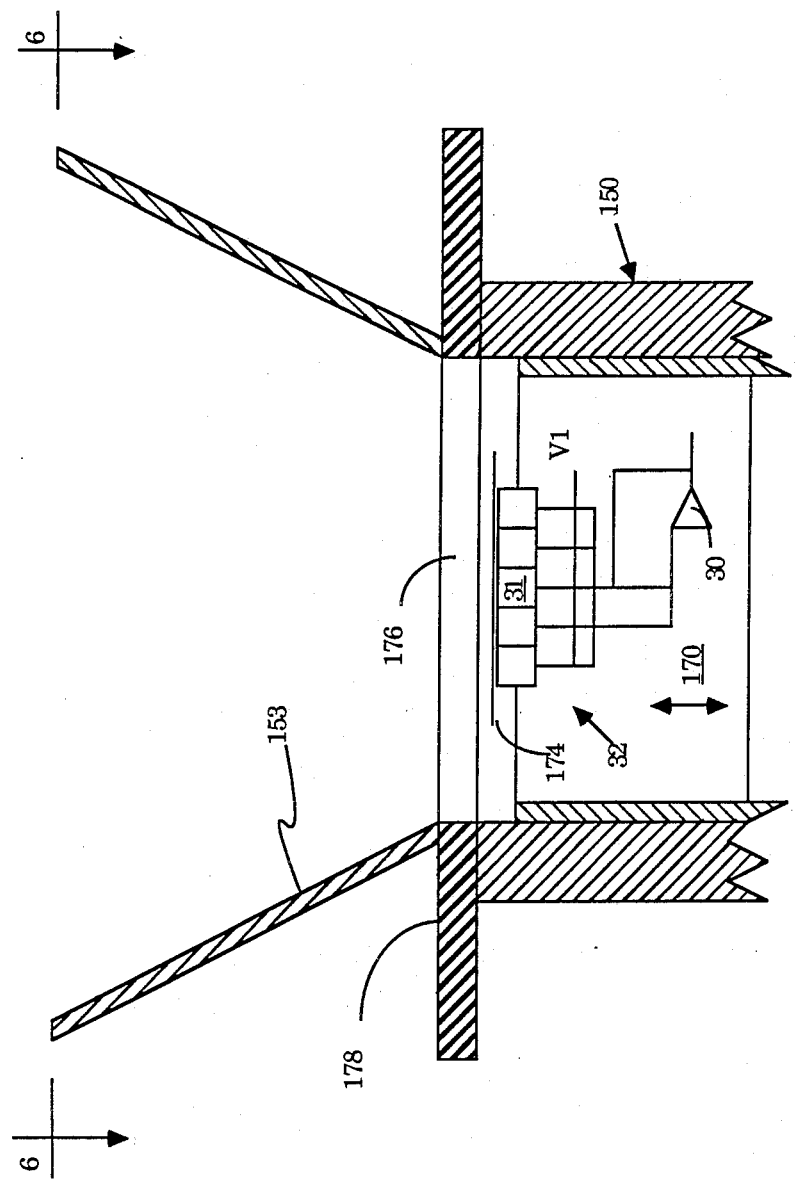

The light sensitive activator 150 is further illustrated in FIGS. 6 and 7 wherein the photoconductive array 32 and photoconductive feedback resistor 31 are illustrated as mounted on a slidable circuit board 170 and coupled to operational amplifier 30 as well as voltage source V1. Each of the photoconductive resistors of the array 32 and resistor 31 include a rectangular photoconductive area of approximately 0.25 inches by 0.050 inches, the photoconductive areas being aligned on the board 170 to form an overall photoconductive area 171 of approximately 1.25 inches by 0.050 inches. A slot 172 having dimensions of 1.25 inches by 0.040 inches is formed in a section of tape 174 disposed immediately above the photoconductive array 32 and photoconductive resistor 31. A second slot 176, substantially proportional to the slot 172 and having dimensions 4 inches by 0.2 inches, is formed in an upper portion 178 of activator 150 at a location directly above the photoconductive array 32 at the base of the light shield 153. The board 170 is moved vertically to adjust the spacing between the photoconductive array 32 and the slot 176 as a means changing the dimensions of airspace 18. As the board 170 is moved toward the slot 176, airspace 18 increases in dimension, while moving the board 170 down and away from the slot 176 reduces the dimensions of airspace 18.

To compensate for the loss of contrast at higher altitudes due to dust and moisture in the air, and to adjust for the amount of light received, the voltage V1 is varied in accordance with the vertical position of the board 170. The voltage V1 is increased as the board 170 is moved away from slot 176 and decreased as it is moved toward slot 176. The voltage V1 (FIGS. 2 and 7) may be derived from a potentiometer, such as indicated at reference numeral 60 of FIG. 8, operated by movement of the board 170 or alternatively may be taken from a terminal on the board 170 contacting a portion of a stationary resistor ladder (not shown) adjacent the board 170. Thus, for a higher altitude aircraft the voltage V1 is increased to improve the sensitivity of the photoconductors and provide a relatively consistent detection signal 22 for any given airplane as the board 170 is moved to provide an airspace corresponding to the altitude of the given airplane.

Figure 8:
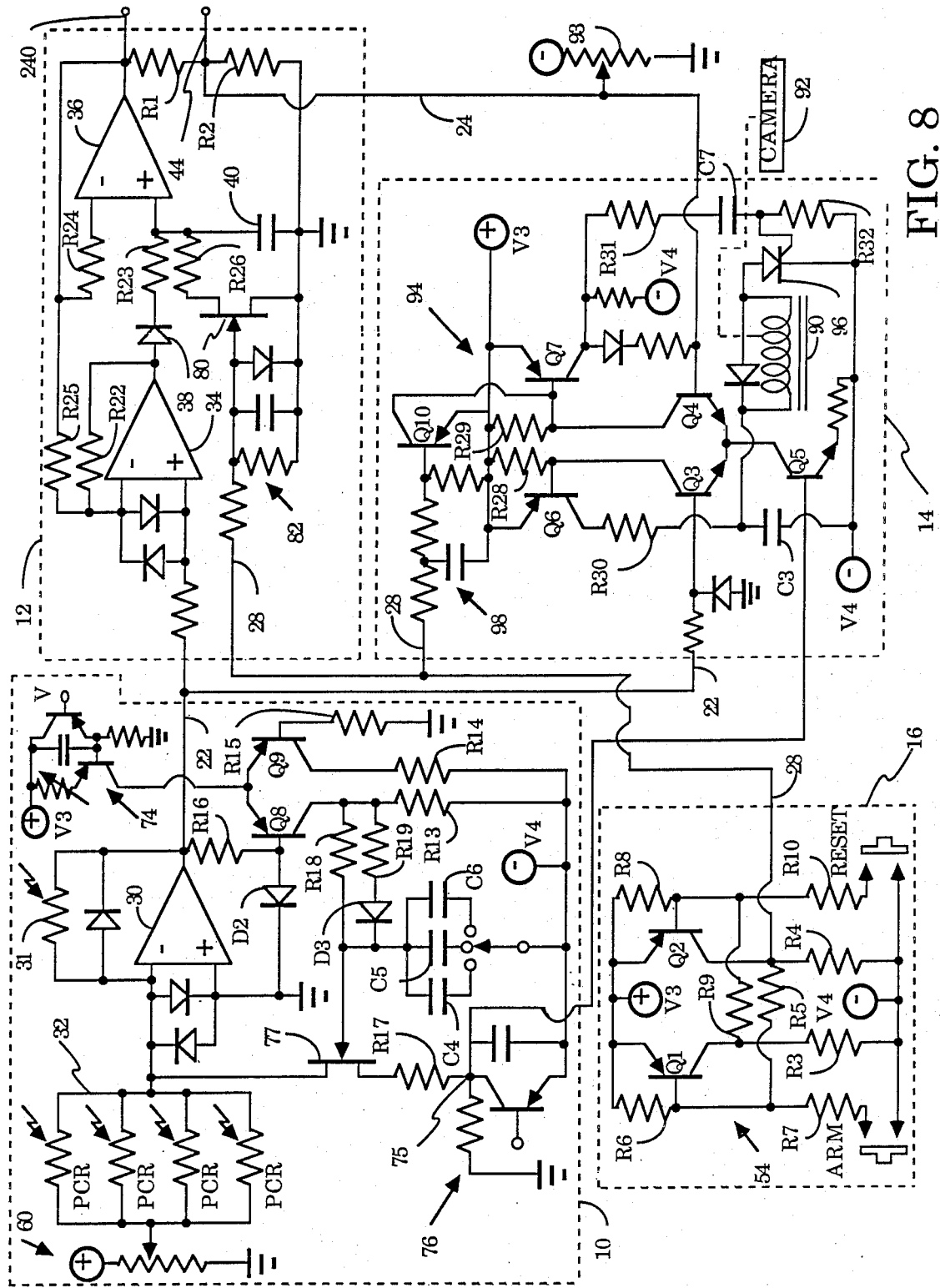
FIG. 8 is a schematic illustration of an alternative embodiment of the circuit of FIG. 1.

FIG. 8 is a more detailed schematic diagram illustrating a further and preferred embodiment of the circuit of FIG. 1. In FIG. 8, reset block 16 includes a flip-flop 54 controlled by an ARM switch and a RESET switch. The flip-flop 54 suitably comprises PNP transistors Q1 and Q2 having their emitters returned to positive voltage source V3 and their collectors connected to negative voltage source V4 via resistors R3 and R4. The base of transistor Q1 is coupled to the collector of transistor Q2 through a resistor R5, to positive voltage source V3 by way of resistor R6, and to negative voltage source V4 through resistor R7 and the ARM switch in series. In similar fashion, the base of transistor Q2 is coupled to the voltage source V3 by resistor R8, to the collector of transistor Q1 by resistor R9, and to the voltage source V4 through resistor R10 and the RESET switch. A reset signal on lead 28 is taken from the collector of transistor Q2 whereby when the RESET switch is engaged, the voltage at the base of transistor Q2 is reduced causing transistor Q2 to conduct current through resistor R4 and raise the voltage on lead 28. By virtue of the connection including resistor R5, the potential at the base of transistor Q1 also rises such that transistor Q1 ceases conducting current through resistor R3, and transistor Q2 is then maintained in a conductive state even after the RESET switch is disengaged. When the ARM switch is engaged the potential at the base of Q1 is reduced whereby transistor Q1 conducts current through resistor R3. As a result the potential at the base of transistor Q2 increases cutting off the flow of current in resistor R4 and lowering the reset signal 28 voltage. Thus, the reset signal 28 can be asserted and remains asserted until the ARM switch is pressed at which time the reset line returns to a relatively low voltage.

Photoconductor array 32, comprising a plurality of separate photoconductive resistors PCR connected in parallel, is interposed between variable voltage source 60 and the inverting input of operational amplifier 30. Amplifier 30 is connected in substantially the manner described in reference to FIG. 2.

Variable current source transistor 74 couples voltage V3 to the emitters of PNP transistors Q8 and Q9, the collectors of which are connected to negative voltage V4 via resistors R13 and R14 respectively. The base of transistor Q9 is connected to ground through resistor R15. The base of transistor Q8 is returned to ground through diode D2 while also being coupled to detection signal path 22 at the output of amplifier 30 via resistor R16. A negative voltage, between ground and negative V4, is provided at a node 75 from a transistor circuit configured as a voltage source 76 wherein node 75 is connected to the inverting input of operational amplifier 30 by way of resistor R17 and FET 77 in series. The gate of FET 77 is returned selectively to voltage V4 through one of the capacitors C4, C5, and C6. Resistor R18 connects the collector of transistor Q8 to the gate of FET 77, with resistor R18 being disposed in parallel with the combination of resistor R19 and diode D3 in series.

It is desirable to be able to adjust the output of operational amplifier 30, i.e., the detection signal on lead 22, to a quiescent state near ground in preparation for detecting changes in the detection signal. Operational amplifier 30 comprises an inverting summing amplifier wherein a first input is provided through the photoconductor array 32, and a negative compensating input is supplied from the negative voltage at the node 75 through resistor R17 and FET 77. The negative compensating input is used to bring the detection signal path 22 up to ground level.

When the circuit is armed, voltage source potentiometer 60 together with array 32 presents a positive signal to operational amplifier 30 and correspondingly a negative signal occurs at the output of amplifier 30. Transistor Q8 then conducts current from current source 74 raising its collector voltage to charge a selected one of capacitors C4, C5, and C6, increasing the gate voltage of FET 77. A resulting reduction in the resistance of FET 77 has the effect of raising the path 22 level towards ground. As signal path 22 approaches ground potential, transistor Q8 tends toward turn off causing a drop in potential at the collector of transistor Q8. Current source 74 is adjusted to maintain the quiescent state of the detection signal path 22 substantially at ground potential. A relatively short term increase in the detection signal above ground potential then indicates a blockage of ambient light otherwise incident upon the photo conductor array 32.

The selected one of the capacitors C4, C5, and C6 establishes a sensitivity level whereby relatively slow moving objects such as clouds do not produce significant changes in the detection signal, while faster moving objects such as airplanes are able to produce detection signal peaks. In conjunction with the aforementioned operation of photoresistor 31, the circuit compensates for changes in ambient light not associated with the passage of airplanes. It will be seen the selected capacitance (C4, C5 or C6) establishes a time constant for voltage change at the gate of FET 77 wherein a large capacitance would allow only relatively slow voltage changes at the gate of FET 77 and a smaller capacitance would permit relatively faster voltage changes at the gate of FET 77. If the voltage at the gate of FET 77 is held to change relatively slowly, then the activation circuit is more sensitive in that the negative compensation voltage provided by the FET 77 will be less effective in maintaining the detection signal 22 near ground potential.

The signal sampling block 12 receives the detection signal 22 at the non-inverting input of operational amplifier 34, the latter having its output fed back to its inverting input by way of resistor R22, and its output returned to ground through diode 38, resistor R23, and holding capacitor 40 in series. Amplifier 36 takes as its non-inverting input the voltage present across holding capacitor 40 while its output is fed back to its inverting input via resistor R24 and to the inverting input of amplifier 34 through resistor R25. Serially connected resistors R1 and R2 return the output of operational amplifier 36 to ground for providing scaled peak signal 24 at node 44. FET 80, with its drain coupled to the non-inverting input of amplifier 36 through resistor R26, its source returned to ground, and its gate coupled to reset signal 28 through drive circuitry 82, is employed to discharge the holding capacitor 40 when the reset signal on lead 28 is asserted.

After arming, and as the detection signal on lead 22 rises above its quiescent level due to the blockage of ambient light otherwise incident upon the photo conductor array 32, the output of amplifier 34 charges the holding capacitor 40 until the detection signal on lead 22 reaches a peak and begins to fall. The voltage present across the terminals of the holding capacitor 40 becomes stabilized for representing the peak value detection signal, since diode 38 prevents discharge of the holding capacitor. The output of amplifier 36, i.e., on lead 240, is then representative of the peak in the detection signal whereby the voltage present at the node 44 provides the scaled peak signal on lead 24 as a fixed percentage of the peak in the detection signal. The last mentioned percentage is a function of the relative resistances of resistors R1 and R2.

Output determination block 14 compares the detection signal on lead 22 with the scaled peak signal on lead 24 and, when the detection signal has peaked, solenoid 90 is activated to cause a camera 92 to take a picture of an object in airspace 18 (FIG. 1). The peak in the detection signal is implied when the detection signal falls below the scaled peak signal. A comparator 94 for detecting this condition comprises transistors Q3 and Q4 having their collectors returned to positive voltage source V3 through resistors R28 and R29, their emitters connected together and coupled to negative voltage source V4 via the collector-emitter path of current source transistor Q5, and their bases coupled to detection signal lead 22 and scaled peak signal lead 24 respectively. The base of transistor Q5 connects to node 75 of voltage source 76 for maintaining a constant current flow through transistor pair Q3, Q4. PNP transistor Q6, having its base attached to the collector of transistor Q3, its emitter returned to voltage source V3, and its collector coupled to voltage source V4 via resistor R30 and capacitor C3 in series, is controlled by the voltage present at the collector of transistor Q3 for charging capacitor C3. Similarly, PNP transistor Q7 is controlled by the voltage present at the collector of transistor Q4, wherein the base of transistor Q7 is connected to the collector of transistor Q4, its emitter is connected to the voltage source V3, and its collector is coupled to the voltage source V4 through resistor R31, capacitor C7, and resistor R32 in series.

A first lead of solenoid 90 connects to the junction between capacitor C3 and resistor R30 while a second terminal of the solenoid is returned to voltage source V4 via silicon controlled rectifier 96 whereby when the silicon controlled rectifier conducts current, the voltage across capacitor C3 is discharged through solenoid 90, e.g., for activating camera 92, or a counter (not shown). The gate of silicon control rectifier 96 is coupled to the midpoint between capacitor C7 and resistor R32 so that when the resistor conducts a predetermined current, the rectifier 96 gate voltage rises and the rectifier 96 fires.

As long as the detection signal on lead 22 is more than the scaled peak signal on lead 24, transistor Q3 conducts and transistor Q4 does not. The voltage at the collector of transistor Q3 is low enough to turn on transistor Q6 while the voltage at the collector of transistor Q4 is high enough to turn off the transistor Q7. It will be seen the flow of current through transistor Q6 results in charging of the capacitor C3. Subsequently, when the detection signal on lead 22 first becomes less than scaled peak signal 24, transistor Q3 ceases conduction and transistor Q4 turns on which turns off transistor Q6 as transistor Q7 conducts. The current through transistor Q7 passes through resistor R32 dropping a voltage thereacross and bringing about conduction in silicon controlled rectifier 96 whereby capacitor C3 is discharged through solenoid 90 to activate camera 92. Potentiometer 93 can be used to determine the minimum turn-on level for transistor Q4. Hence the minimum peak in the FIG. 3 waveform is detected.

During reset, the output determination block 14 is inhibited from activating the camera 92. PNP transistor Q10, having its base coupled to lead 28 through drive circuitry 98, its emitter returned to voltage source V3, and its collector connected to the collector of transistor Q4, is responsive to an asserted reset signal on lead 28 for maintaining the voltage at the collector of transistor Q4 and the base of transistor Q7 high enough to ensure the transistor Q7 remains off. Thus, silicon controlled rectifier 96 is held in a non-conductive state whereby solenoid 90 is inoperative.

Figure 9:
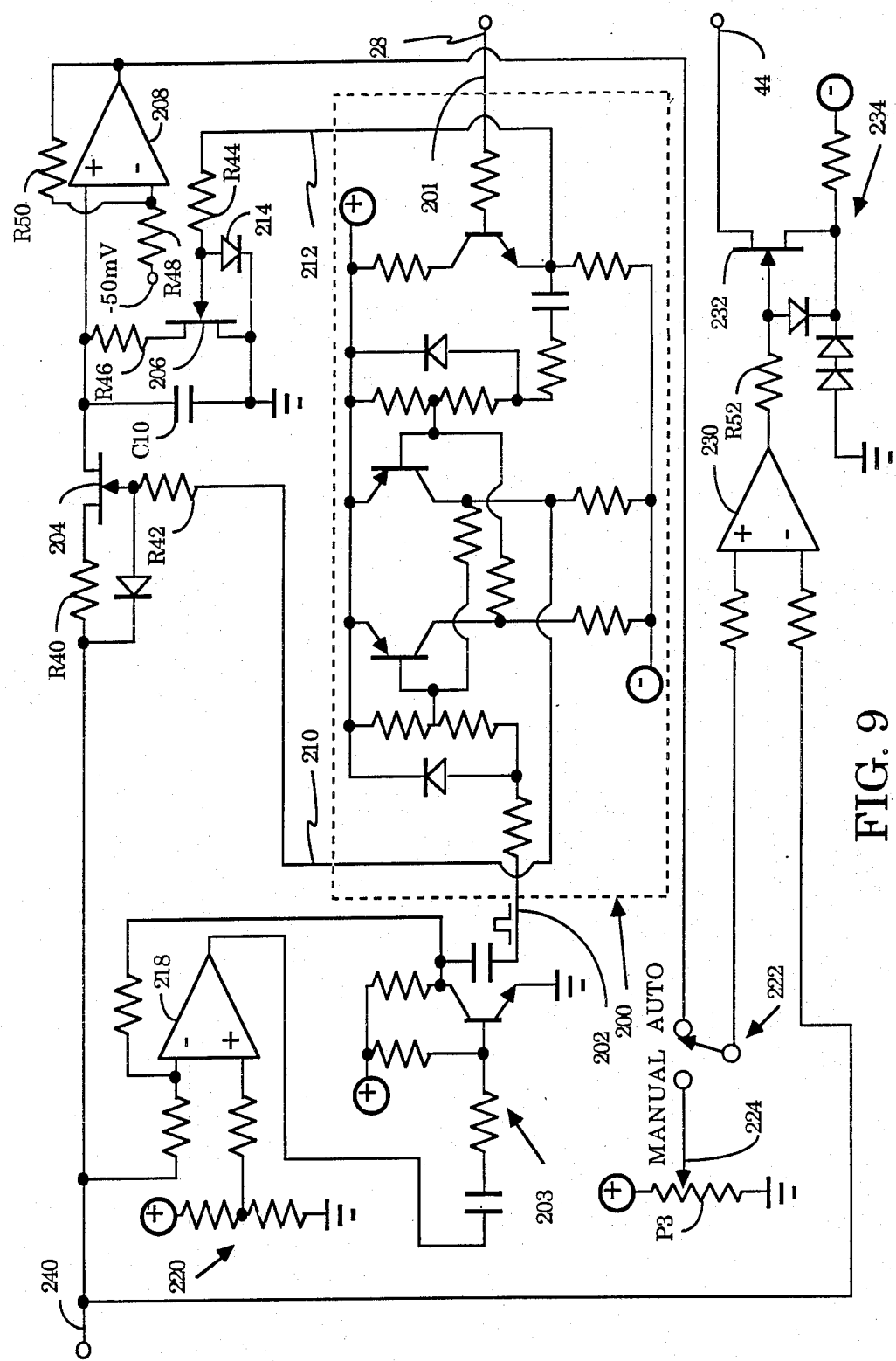
FIG. 9 is a schematic circuit diagram of an automatic threshold circuit.

As previously noted it is desirable to inhibit the activation circuit for peaks in the detection signal 22 below a given threshold. As an alternative to manually adjusting a threshold voltage, e.g., with a potentiometer P1 of FIG. 2 or potentiometer 93 in FIG. 8, an automatic threshold circuit as illustrated in FIG. 9 may be employed for storing a voltage level corresponding to a forward portion of a plane body to establish a reliable threshold voltage above which the wing section is known to drive the detection signal. The established threshold voltage is used to inhibit the activation circuit until the detection signal is found to be above the threshold.

Referring to FIG. 9, a flip-flip circuit 200, having a first input terminal 201 coupled to the reset signal 28 line of the activation circuit in FIG. 8 and a second input terminal 202 connected to a timed pulse circuit 203, is used to operate FETs 204 and 206. FET 204 receives at its source terminal a version of the increasing detection signal (stored on capacitor 40) from lead 240 via resistor R40, while its drain terminal is returned to ground through a capacitor C10 as well as being coupled to the non-inverting input of an operational amplifier 208. The gate of FET 204 is connected to a first output lead 210 of the circuit 200 through resistor R42. FET 206 is coupled at its gate to another output lead 212 of circuit 200 via resistor R44 and to ground through a diode 214. The source terminal of FET 206 is returned to ground. The drain terminal of the same FET is connected to the positive input of the operational amplifier 208 by way of resistor R46.

A timed pulse circuit 203 is controlled by the output of a comparator 218 such that when the output of comparator 218 is driven negative, circuit 203 presents a positive pulse of predetermined duration at input terminal 202 of circuit 200. The duration of the pulse is less than the time required for the forward portion of a body section of a plane, not including the wing section, to pass through an optical window.

The noninverting input of comparator 218 is taken from a voltage divider 220 set to provide a voltage level comparable to the signal produced pursuant to detecting the nose section of an airplane. The inverting input of the comparator 218 receives the stored detection signal from lead 240 for comparison with the last mentioned voltage level such that its output is driven negative when the detection signal from lead 240 rises above the voltage level. A positive pulse is consequently presented at the terminal 202 when a nose section of an airplane is detected.

At the inverting input of the operational amplifier 208, a −50 mV signal is applied through a resistor R48, and the output of operational amplifier 208 is fed back to its inverting input through resistor R50 having twice the resistance of resistor R48 so as to provide amplifier 208 with a gain of two. The output of operational amplifier 208 is connected to an AUTO contact of a switch 222. A MANUAL contact of the switch 222 is connected to a movable terminal 224 of potentiometer P3 coupled between a positive and a negative voltage.

The signal on lead 240 is applied to the inverting input of operational amplifier 230 while the non-inverting input of amplifier 230 is connected to the movable contact of switch 222 for providing selective coupling between the operational amplifier 230 and either potentiometer P3 or the output of the operational amplifier 208. The output of operational amplifier 230 is connected via resistor R52 to the gate of FET 232 having its source terminal coupled to a −1.2 voltage supply 234 and its drain connected to terminal 44 of the activation circuit of FIG. 8. By means of coupling the terminal 44 (FIG. 8) to the negative voltage supply 234 (FIG. 9), the activation circuit is disabled because the scaled peak signal on lead 24 (FIG. 8) will be held below the detection signal. Thus, when the output of operational amplifier 230 is driven high, the activation circuit is disabled, and when its output is negative the activation circuit is enabled.

The circuit may be operated in one of two modes, i.e., manual setting of the threshold level and automatic setting of the threshold level. Manual adjustment of the threshold level can be most effective when the sun is near the horizon. When the switch 222 is set to couple the movable terminal 224 to the non-inverting input of operational amplifier 230, the potentiometer is manually adjusted to provide a suitable threshold voltage. When the switch 222 couples the output of operational amplifier 208 to the non-inverting input of operational amplifier 230, the threshold circuit will detect the presence of a nose section in the window 18 (FIG. 1) and establish a suitable threshold voltage.

When the activation circuit is reset via lead 28, circuit 200 presents a high voltage at its output 212 and a low voltage at its output 210 thereby turning FET 204 off and FET 206 on. At this time, the detection signal on lead 240 will be substantially at ground potential and the output of operational amplifier 208 is approximately +0.1 volts, such that the output of operational amplifier 230 is positive, turning on FET 232 and disabling the activation circuit.

When the activation circuit is then armed, i.e., the signal on lead 28 drops, circuit 200 changes state whereby FET 204 is turned on and FET 206 is turned off. In this condition it will be seen the voltage across capacitor C10 follows the detection signal on lead 240. As the nose of an airplane passes through the optical window and the detection signal on lead 240 exceeds the voltage level taken from voltage divider 220, the output of operational amplifier 218 becomes negative and causes the timed pulse circuit 203 to present a positive pulse at terminal 202 of circuit 200. During this positive pulse, the voltage across the capacitor C10 increases to a point corresponding to the width of the forward body section of the airplane; this voltage is doubled by operational amplifier 208 and presented as a suitable threshold voltage to the non-inverting input of the operational amplifier 230, assuming switch 222 is in the AUTO position. On the falling edge of the positive pulse presented to terminal 202, circuit 200 changes state to turn FET 204 off and thereby decouple the operational amplifier 208 from the detection signal on lead 240, the output of operational amplifier 208 then being a function of a stored voltage on the capacitor C10. In this manner a suitable threshold voltage is stored and provided to operational amplifier 230. Subsequently when the system is reset, transistor 206 is again turned on for discharging capacitor C10. The automatic threshold circuit may be used in an alternative manner wherein it is incorporated into an activation circuit used to generate and store a threshold voltage on a first fly by for use during a subsequent fly by.

While plural embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A light sensitive activator for providing a signal in response to passage of an object of a given shape through a defined airspace, said activator comprising:
   sensor means exposed to ambient light by way of said airspace;

data acquisition means for providing a detection signal representing an amount of ambient light incident upon said sensor means, wherein the detection signal waveform is a function of the shape of the object as the object passes through said airspace; and means for ascertaining passage of said object of said given shape by receiving said detection signal and responding to a peak value therein to provide an activation signal.

2. The light sensitive activator according to claim 1, wherein said data acquisition means includes means for maintaining said detection signal at a known reference value by compensating for changes in ambient light incident upon the sensor means other than changes caused by the passage of said object of a given shape through the airspace.

3. The light sensitive activator according to claim 1, wherein the object of a given shape comprises an aircraft and the detection signal waveform corresponding to the aircraft includes a signal peak caused by the passage of a wing section of the aircraft through said airspace.

4. The light sensitive activator according to claim 1, wherein said means for ascertaining passage of an object includes comparator means for comparing the current detection signal to a reference value to provide the activation signal as output of the comparator means.

5. The light sensitive activator according to claim 4, wherein said ascertaining means includes data storage means for holding a peak value of the detection signal and the reference value is set in accordance therewith.

6. The light sensitive activator according to claim 1, wherein the sensor means includes photoconductors and the data acquisition means defines an optical window through which light from said airspace passes to reach the photoconductors.

7. The light sensitive activator according to claim 6, wherein said optical window comprises an optical slit extending generally in a direction orthogonal to the direction of movement of said object.

8. The light sensitive activator according to claim 1, wherein said data acquisition means comprises a summing amplifier provided with a photoconductive element in the form of a photoconductive resistor disposed in feedback relation to said amplifier, said sensor means comprising photoconductive elements also in the form of photoconductive resistors responsive to substantially the same ambient light as the photoconductive resistor in feedback relation to said amplifier.

9. A light sensitive activator for providing an activation signal, said activator comprising:
data acquisition means including photoconductive elements for measuring ambient light incident thereon, and light shielding means for defining an optical airspace through which ambient light travels to reach the photoconductive elements, said data acquisition means producing a detection signal representing an amount of ambient light incident upon the photoconductive elements and thereby responding to blockage of ambient light caused by the presence of an object in the airspace;
data sampling means for capturing a peak value in the detection signal and providing a scaled peak signal, the scaled peak signal being a fixed percentage of the captured peak value; and
comparator means for comparing the scaled peak signal to the detection signal and providing the activation signal when the detection signal is less than the scaled peak signal.

10. The light sensitive activator according to claim 9, wherein said data acquisition means includes compensation means for setting the detection signal to a known reference value when no object is present in the airspace.

11. The light sensitive activator according to claim 9, further comprising means for inhibiting generation of the activation signal when the detection signal is below a threshold value.

12. The light sensitive activator according to claim 9, wherein said data acquisition means includes a summing amplifier having a summing node and said photoconductive elements couple the summing node to a voltage source, the data acquisition means further comprising means responsive to the detection signal for providing a compensating signal at the summing node for maintaining the detection signal at a known reference value in response to variations in the detection signal other than those associated with the presence of the object in the airspace.

13. The light sensitive activator according to claim 9, further comprising:
means for establishing a threshold value as a function of the size of the object; and
means for inhibiting generation of the activation signal when the detection signal is below the established threshold.

14. The light sensitive activator according to claim 13, wherein the object is an airplane having a body section and a wing section and the established threshold value is a function of the size of the body section.

15. A method of providing an activation signal in response to the passage of an airplane, the method comprising:
defining an optical airspace as the space through which ambient light passes to reach light sensor means;
generating a detection signal representing an amount of ambient light incident upon light sensor means and thereby responding to blockage of ambient light caused by the presence of an airplane in the airspace;
storing a peak value of the detection signal; and
comparing a function of the peak value to the detection signal and providing the activation signal in response to said comparison.

* * * * *